(12) United States Patent
Susser et al.

(10) Patent No.: US 6,907,608 B1
(45) Date of Patent: Jun. 14, 2005

(54) TECHNIQUES FOR PERMITTING ACCESS ACROSS A CONTEXT BARRIER IN A SMALL FOOTPRINT DEVICE USING GLOBAL DATA STRUCTURES

(75) Inventors: Joshua Susser, San Francisco, CA (US); Mitchel B. Butler, Sunnyvale, CA (US); Andy Streich, Foster City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/235,156

(22) Filed: Jan. 22, 1999

(51) Int. Cl.[7] .................................................. G06F 9/54
(52) U.S. Cl. ........................ 719/315; 719/313; 718/108; 713/167
(58) Field of Search ............................... 719/315, 313; 718/108; 713/167; 709/310, 312, 313, 315, 316, 201, 202, 225, 216, 217, 107

(56) References Cited

U.S. PATENT DOCUMENTS

| | | | | |
|---|---|---|---|---|
| 4,930,129 A | * | 5/1990 | Takahira | 235/380 |
| 5,057,997 A | * | 10/1991 | Chang et al. | 709/108 |
| 5,204,663 A | | 4/1993 | Lee | 340/825.34 |
| 5,204,897 A | | 4/1993 | Wyman | 380/4 |
| 5,452,431 A | | 9/1995 | Bournas | 707/100 |
| 5,481,715 A | * | 1/1996 | Hamilton et al. | 709/316 |
| 5,544,246 A | | 8/1996 | Mandelbaum et al. | 380/23 |
| 5,594,227 A | | 1/1997 | Deo | |
| 5,649,118 A | | 7/1997 | Carlisle et al. | 395/241 |
| 5,721,781 A | | 2/1998 | Deo et al. | |
| 5,742,756 A | | 4/1998 | Dillaway et al. | |
| 5,768,385 A | | 6/1998 | Simon | |
| 5,781,723 A | | 7/1998 | Yee et al. | |
| 5,802,519 A | | 9/1998 | De Jong | |
| 5,894,550 A | * | 4/1999 | Thiriet | 713/200 |
| 5,912,453 A | * | 6/1999 | Gungl et al. | 235/375 |
| 6,052,690 A | | 4/2000 | de Jong | 707/101 |
| 6,094,656 A | | 7/2000 | De Jong | 707/100 |
| 6,173,391 B1 | * | 1/2001 | Tabuchi et al. | 709/108 |
| 6,220,510 B1 | * | 4/2001 | Everett et al. | 235/379 |
| 6,233,683 B1 | | 5/2001 | Chan et al. | |
| 6,292,874 B1 | * | 9/2001 | Barnett | 703/23 |
| 6,308,317 B1 | | 10/2001 | Wilkinson et al. | |
| 6,349,336 B1 | * | 2/2002 | Sit et al. | 709/227 |

FOREIGN PATENT DOCUMENTS

| | | | | |
|---|---|---|---|---|
| DE | 4126213 | 2/1993 | | G06K/19/07 |
| EP | 0190733 | 8/1986 | | |
| EP | 0466969 | 1/1992 | | G07F/7/10 |
| EP | 0666550 | 8/1995 | | |
| JP | 01277993 A | 11/1989 | | G06K/19/00 |
| JP | 02156357 A | 6/1990 | | G06F/12/14 |
| JP | 05089303 A | 4/1993 | | G06K/19/07 |
| WO | WO 87/07062 | 11/1987 | | |
| WO | WO 94/10657 | 5/1994 | | |
| WO | WO 98/19237 | 5/1998 | | G06F/9/46 |

OTHER PUBLICATIONS

Mondex International Limited. "Multi–Application IC Card System." WO 98/37526. Aug. 27, 1998.*

(Continued)

*Primary Examiner*—Lewis A. Bullock, Jr.
(74) *Attorney, Agent, or Firm*—Gunnison, McKay & Hodgson, L.L.P.

(57) ABSTRACT

A small footprint device can securely run multiple programs from unrelated vendors by the inclusion of a context barrier isolating the execution of the programs. The context barrier performs security checks to see that principal and object are within the same namespace or memory space or to see that a requested action is authorized for an object to be operated upon. Each program or set of programs runs in a separate context. Access from one program to another program across the context barrier can be achieved under controlled circumstances by using a global data structure.

4 Claims, 12 Drawing Sheets-

OTHER PUBLICATIONS

Schlumberger Industries. "Smart Card Application–Selection." WO 99/16030. Apr. 1, 1999.*

Chan, Siu–cheung Charles. "Infrastructure of Multi–Application Smart Card". Aug. 17, 1997.*

Philips Semiconductors. "Designers offered first 16–bit smart card IC architecture with development tools". Press Release. Sep. 21, 1998.*

Cordonnier, et al. "The concept of suspicion: a new security model for identification management in smart cards." 1997.*

Lee, Chan Y. "Detecting Out–of–Range References." Jun. 1993.*

"Java Card 2.0 Programming Concepts", Oct. 15, 1997 Revision 1.0 Final 1997 Sun Microsystems, Inc.

"Java Card 2.0 Language Subset and Virtual Machine Specification", Oct. 13, 1997 Revision 1.0 Final 1997 Sun Microsystems, Inc.

"Java Card 2.0 Application Programming Interfaces", Oct. 13, 1997 Revision 1.0 Final 1997 Sun Microsystems, Inc.

"Java Card Applet Developer's Guide", Revision 1.12 Aug. 19, 1998 Sun Microsystems, Inc.

Gong, et al., "Going Beyong the Sandbox: An Overview of the New Security Architecture in the Java Development Kit 1.2" USENIX Symposium, Dec. 8–11, 1997.

Islam, et al., "A Flexible Security Model for Using Internet Content," IBM T.J. Watson Research Center, Jun. 28, 1997.

Sun Microsystems, Inc., "Java Card Runtime Environment (JCRE) 2.1 Specification—Draft 2", Dec. 14, 1998.

Daniels, John et al., "Strategies For Sharing Objects In Distributed Systems", JOOP, *Object Designers Ltd., UK*, pp. 27–36.

Ritchey, Tim, "Advanced Topics: The Java Virtual Machine", *Java!,* Chapter 14, pp. 25–346, Sep. 22, 1995.

Sun Microsystems, Inc., "Java Card™ 2.0 Language Subset and Virtual Machine Specification", Oct. 13, 1997, Revision 1.0 Final.

Sun Microsystems, Inc., "Java Card™ 2.0 Programming Concepts", Oct. 15, 1997, Revision 1.0 Final.

"Sun Microsystems Announces JAVACARD API", Business Wire, Oct. 1996.

* cited by examiner

TECHNIQUES FOR PERMITTING ACCESS ACROSS A CONTEXT BARRIER IN A SMALL FOOTPRINT DEVICE USING GLOBAL DATA STRUCTURES

CROSS-REFERENCES TO RELATED APPLICATIONS

This application is related to U.S. patent application Ser. No. 08/839,621, filed Apr. 15, 1997, entitled "VIRTUAL, MACHINE WITH SECURELY DISTRIBUTED BYTE CODE VERIFICATION", in the name of inventors Moshe Levy and Judy Schwabe, which application is incorporated herein by reference in its entirety.

This application is related to U.S. patent application Ser. No. 10/659,554, filed Sep. 9, 2003 in the name of inventors Joshua Susser, Mitchel B. Butler and Andy Streich, entitled "Techniques for Permitting Access Across a Context Barrier on a Small Footprint Device Using an Entry Point Object", which is a continuation of U.S. patent application Ser. No. 09/235,157, now U.S. Pat. No. 6,633,984, filed Jan. 22, 1999, entitled "TECHNIQUES FOR PERMITTING ACCESS ACROSS A CONTEXT BARRIER ON A SMALL FOOTPRINT DEVICE USING AN ENTRY POINT OBJECT", in the name of inventors Joshua Susser, Mitchel B. Butler, and Andy Streich, which application is incorporated herein by reference in its entirety.

This application is related to U.S. patent application Ser. No. 09/235,158, filed Jan. 22, 1999, entitled "TECHNIQUES FOR IMPLEMENTING SECURITY ON A SMALL FOOTPRINT DEVICE USING A CONTEXT BARRIER, in the name of inventors Joshua Susser, Mitchel B. Butler, and Andy Streich, which application is incorporated herein by reference in its entirety.

This application is related to U.S. patent application Ser. No. 09/235,155, filed Jan. 22, 1999, entitled "TECHNIQUES FOR PERMITTING ACCESS ACROSS A CONTEXT BARRIER ON A SMALL FOOTPRINT DEVICE USING RUN TIME ENVIRONMENT PRIVILEGES", in the name of inventors Joshua Susser, Mitchel B. Butler, and Andy Streich, which application is incorporated herein by reference in its entirety.

This application is related to U.S. patent application Ser. No. 09/235,159, filed Jan. 22, 1999, entitled "TECHNIQUES FOR PERMITTING ACCESS ACROSS A CONTEXT BARRIER IN A SMALL FOOTPRINT USING SHARED OBJECT INTERFACES", in the name of Susser, Mitchel B. Butler, and Andy Streich, which application is herein by reference in its entirety.

BACKGROUND OF THE INVENTION

1. Field of the Invention

The invention relates to computer security and more particularly to techniques for implementing a security on small footprint devices, such as smart cards.

2. Description of Related Art

A number of object oriented programming languages are well known in the art. Examples of these include the C++ language and the Smalltalk language.

Another such object oriented language is the JAVA™ language. This language is described in the book Java™ Language Specification, by James Gosling et al. and published by Addison-Wesley. This work is incorporated herein by reference in its entirety. The JAVA™ language is particularly well suited to run on a Java™ Virtual Machine. Such a machine is described in the book Java™ Virtual Machine Specification, by Tim Lindholm and Frank Yellin which is also published by Addison-Wesley and which is also incorporated herein by reference in its entirety.

A number of small footprint devices are also well known in the art. These include smart cards, cellular telephones, and various other small or miniature devices.

Smart cards are similar in size and shape to a credit card but contain; typically, data processing capabilities within the card (e.g. a processor or logic performing processing functions) and a set of contacts through which programs, data and other communications with the smart card may be achieved. Typically, the set of contacts includes a power source connection and a return as well as a clock input, a reset input and a data port through which data communications can be achieved.

Information can, be written to a smart card and retrieved from a smart card using a card acceptance device. A card acceptance device is typically a peripheral attached to a host computer and contains a card port, such as a slot, in to which a smart card can be inserted. Once inserted, contacts or brushes from a connector press against the surface connection area on the smart card to provide power and to permit communications with the processor and memory typically found on a smart card.

Smart cards and card acceptance devices (CADs) are the subject of extensive standardization efforts, e.g. ISO 7816.

The use of firewalls to separate authorized from unauthorized users is well known in the network environment. For example, such a firewall is disclosed in U.S. patent application Ser. No. 09/203,719, filed Dec. 1, 1998 and entitled "AUTHENTICATED FIREWALL TUNNELLING FRAMEWORK" in the name of inventor David Brownell, which application is incorporated herein by reference in its entirety.

A subset of the full Java™ platform capabilities has been defined for small footprint devices, such as smart cards. This subset is called the Java Card™ platform. The uses of the Java Card™ platform are described in the following publications.

JAVA CARD™ 2.0—LANGUAGE SUBSET AND VIRTUAL MACHINE SPECIFICATION;

JAVA CARD™ 2.1—APPLICATION PROGRAMMING INTERFACES;

JAVA CARD™ 2.0—PROGRAMMING CONCEPTS;

JAVA CARD™ APPLET DEVELOPER'S GUIDE.

These publications are incorporated herein by reference in their entirety.

A working draft of ISO 7816—Part 11 has been circulated for comment. That draft specifies standards for permitting separate execution contexts to operate on a smart card. A copy of that working draft is hereby incorporated by reference in its entirety.

The notion of an execution context is well known in computer science. Generally speaking, the use of multiple execution contexts in a computing environment provides a way to separate or isolate different program modules or processes from one another, so that each can operate without undue interference from the others. Interactions—if any—between different contexts are deliberate rather than accidental, and are carefully controlled so as to preserve the integrity of each context. An example of multiple contexts is seen in larger hardware devices, such as mainframes, where a plurality of virtual machines may be defined, each such virtual machine having its own execution context. Another example is seen in U.S. Pat. No. 5,802,519 in the name of inventor De Jong, which describes the use of multiple execution contexts on a smart card. It will be appreciated by those of skill in the art that a computing environment which provides multiple execution contexts also needs to provide a mechanism for associating any given executing code with its corresponding context.

Also well known is the notion of a current context. Certain computing environments that support multiple contexts will, at any given time, treat one context in particular as an active focus of computation. The context can be referred to as the "current context." When the current context changes, so that some other context becomes the current context, a "context switch" is said to occur. As will be appreciated by those of skill in the art, these computing environments provide mechanisms for keeping track of which context is the current one and for facilitating context switching.

In the prior art, in the world of small footprint devices, and particularly in the world of smart cards, there was no inter-operation between contexts operating on the small footprint devices. Each context operated totally separately and could operate or malfunction within its context space without affecting other applications or processes in a different context.

One layer of security protection utilized by the Java™ platform is commonly referred to as a sandbox model. Untrusted code is placed into a "sandbox" where it can "play" safely without doing any damage to the "real world" or full Java™ environment. In such an environment, Java™ applets don't communicate, but each has its own name space.

Some smart card operating systems don't permit execution contexts to communicate directly, but do permit communications through an operating system, or through a server.

The Problems

A number of problems exist when trying to place computer programs and other information on a small footprint device. One of the compelling problems is the existence of very limited memory space. This requires often extraordinary efforts to provide needed functionality within the memory space.

A second problem associated with small footprint devices is the fact that different small footprint device manufacturers can utilize different operating systems. As a result, applications developed for one operating system are not necessarily portable to small footprint devices manufactured by a different manufacturer.

If programs from more than one source of programs (manufacturer or vendor) are to be applied to a single small footprint device, security becomes a factor as one attempts to avoid corruption of existing programs and data when a new program is loaded on to the small footprint device. The same concern exists when one wishes to prevent a hacker or a malicious person from accessing programs and data.

It is clear that small footprint devices such as smart cards don't have the resources necessary to implement separate virtual machines. Nevertheless, it is desirable to maintain strict security between separate execution contexts.

In the past, security was provided by loading only applications from the same source or from a known trusted source onto a smart card or other small footprint device.

Accordingly, it would be desirable to allow object-oriented interaction between selected execution contexts only in safe ways via fast efficient peer to peer communications which do not impose undue burdens on the programmer but facilitate dynamic loading of applets written at different times by untrusted sources.

SUMMARY OF THE INVENTION

The invention is directed to providing a context barrier (sometimes referred to as a firewall) for providing separation and isolation of one context from another and to provide controlled access across the barrier when that is needed.

In accordance with the invention, two execution contexts, e.g. each containing one or more applets, running in the same logical (i.e., virtual or real) machine, protected from each other, can share information in a controlled, secure way, using language mechanisms, such as object-oriented language mechanisms. Security can be, for example, object by object. Thus, a method in a first execution context can access a first object A in a second execution context, but not a second object B in the second execution context on a selective basis.

In accordance with one exemplary embodiment, an enhanced Java™ Virtual Machine (VM) provides certain run-time checks of attempted access across execution contexts in the VM. Checks can be automatic by the VM or coded by the programmer with support from the VM. This can be done using language-level communication mechanisms. In this way, one can express object access across execution contexts in the same way as other object accesses using the language are made. These run-time checks provide a second dimension of defense/security beyond that which the Java™ language and platform already provide.

These mechanisms provide protection against, e.g., security holes due to programming bugs (such as declaring a datum "public" (global) when it shouldn't be accessible to all contexts). They also allow fine-grain control of sharing (such as selection of objects to share and applets to share to).

The invention is also directed to computer program products and carrier waves related to the other aspects of the invention.

The foregoing and other features, aspects and advantages of the present invention will become more apparent from the following detailed description of the present invention when taken in conjunction with the accompanying drawings.

BRIEF DESCRIPTION OF THE DRAWINGS

The features and advantages of the present invention will be apparent from the following description in which.

Notations and Nomenclature

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or other computational devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION

Attached as an Appendix to this specification is an unpublished draft of a document entitled JAVA CARD RUNTIME ENVIRONMENT 2.1 SPECIFICATION. This draft document, which provides further detailed description of specific embodiments of the invention, is incorporated in its entirety as an integral part of the present specification.

Although the inventive techniques are described hereinafter in the context of a smart card example, the example is merely illustrative and shouldn't limit the scope of the invention.

Figure 1:
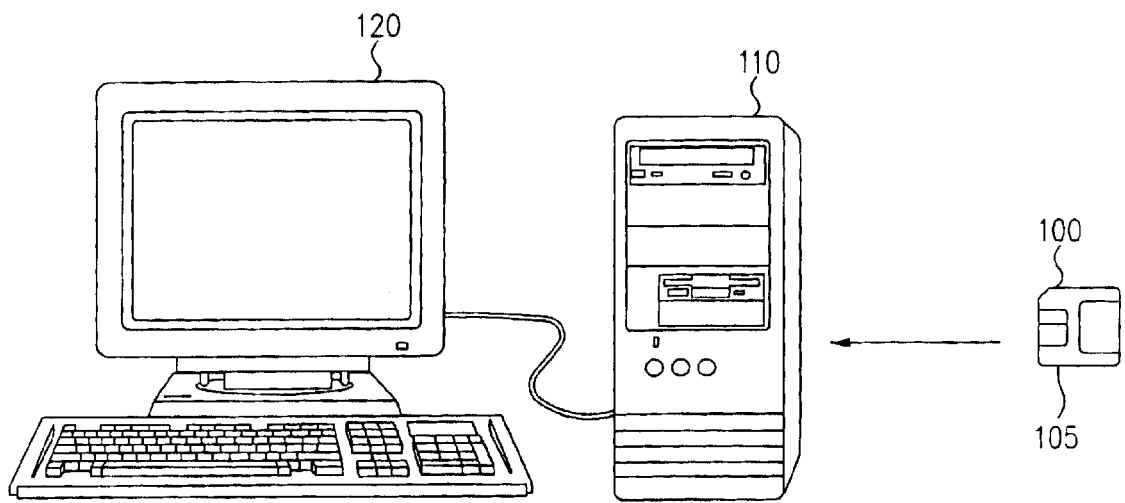
FIG. 1 is an illustration of a computer equipped with a card acceptance device and of a smart card for use with the card acceptance device.

FIG. 1 is an illustration of a computer 120 equipped with a card acceptance device 110 and a smart card 100 for use with the card acceptance device 110. In operation, the smart card 100 is inserted into card acceptance device 110 and power and data connections applied through a set of contacts 105 accessible at the surface of the smart card 100. When the card is inserted, mating contacts from the card acceptance device 110 interconnect with the surface contacts 105 to power-up the card and permit communications with the onboard processor and memory storage.

Figure 2:
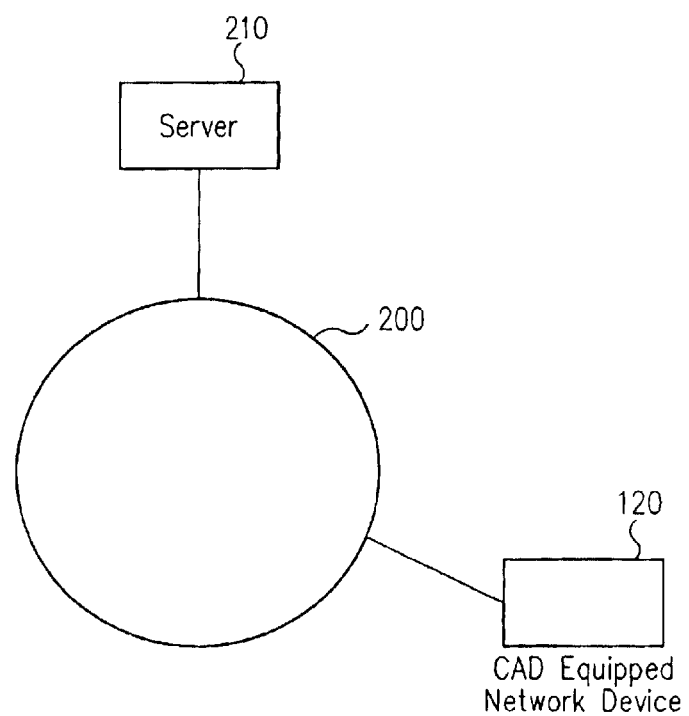
FIG. 2 is an illustration of a computer equipped with a card acceptance device connected to a network.

FIG. 2 is an illustration of a computer equipped with a card acceptance device, such as 120 in FIG. 1, connected to a network 200. Also connected to a network are a plurality of other computing devices, such as server 210. It is possible to load data and software onto a smart card over the network 200 using card equipped device 120. Downloads of this nature can include applets or other programs to be loaded onto a smart card as well as digital cash and other information used in accordance with a variety of electronic commerce and other applications. The instructions and data used to control processing elements of the card acceptance device and of the smart card may be stored in volatile or non-volatile memory or may be received directly over a communications link, e.g., as a carrier wave containing the instructions and/or data. Further, for example, the network can be a LAN or a WAN such as the Internet or other network.

Figure 3:
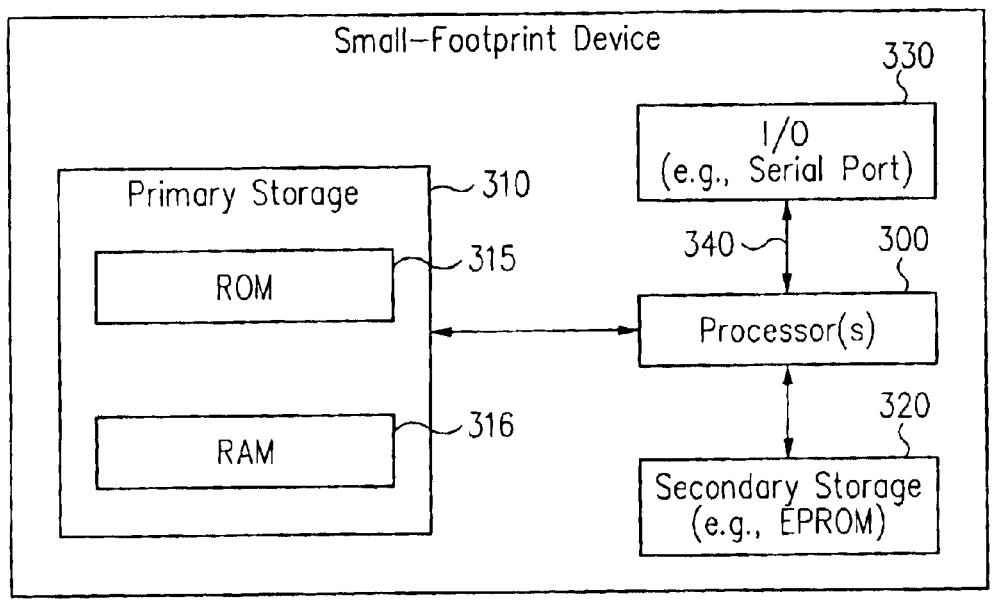
FIG. 3 is an exemplary hardware architecture of a small footprint device, such as a smart card, of the prior art.

FIG. 3 is an exemplary hardware architecture of a small footprint device, such as a smart card, of the prior art. As shown in FIG. 3, a processor 300 interconnects with primary storage 310 which may include read only memory 315 and/or random access memory 316. The processor also connects with a secondary storage 320 such as EEPROM and with an input/output 330, such as a serial port. One can see the small footprint devices of this nature can be very simple.

Figure 4:
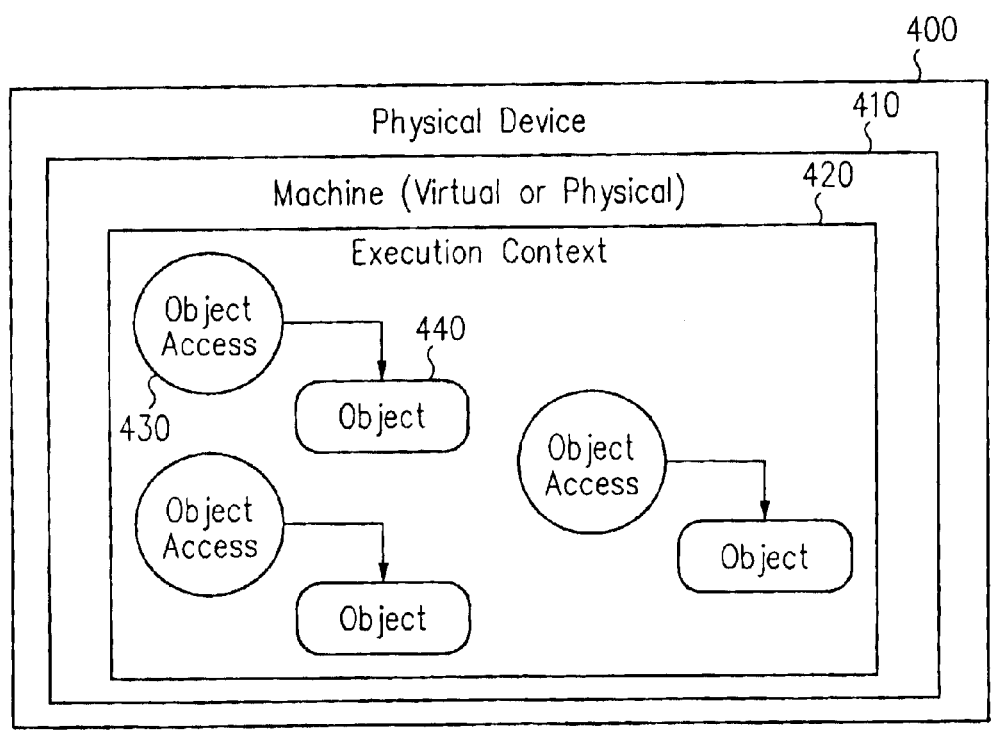
FIG. 4 illustrates objects being accessed by principals as done in the prior art.

FIG. 4 illustrates objects being accessed by principals as done in the prior art. As shown in FIG. 4, physical device 400, such as the small footprint device may have contained within it one or more processing machines (virtual or physical) which are running an execution context 420. The execution context may be, for example, a context associated with a particular applet. One or more principals 430 (e.g., applets or applications) in the execution context may seek to access other objects within the execution context. As long as the access occurs within the execution context, the accesses will be permitted and everything will function normally.

Figure 5:
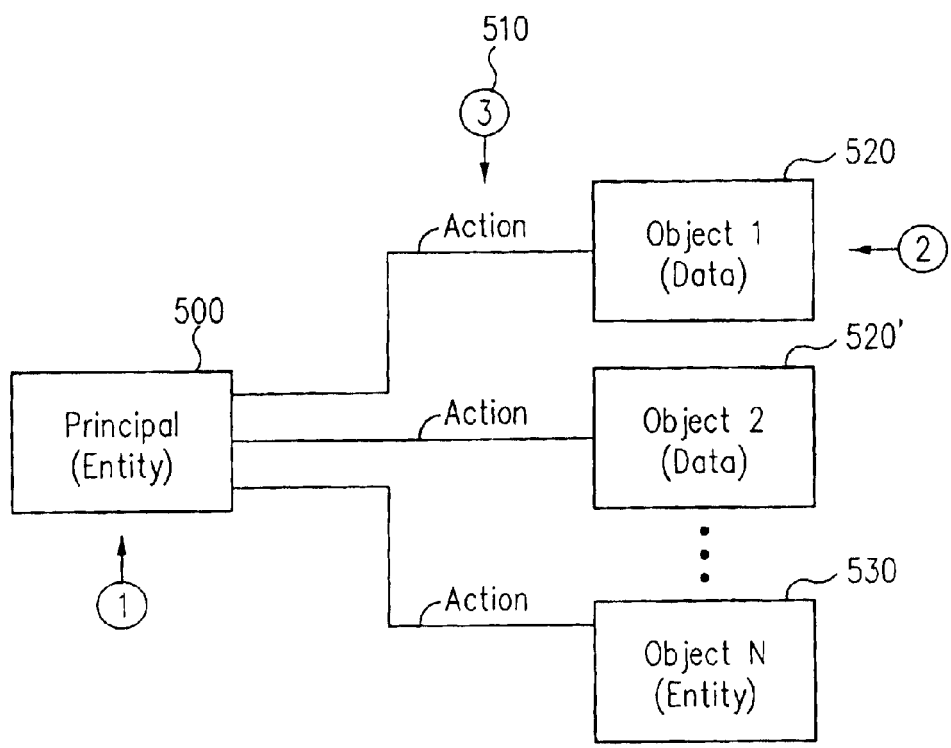
FIG. 5 is an exemplary security model which can be used in explaining the various embodiments of the invention.

FIG. 5 is an exemplary security model which can be used in explaining the various embodiments of the invention. It is just one of many models which might be utilized but is a convenient model for this purpose. In this model, a principal (sometimes called entity) 500 proposes to take an action 510 on an object, such as object 520. Security checks may be imposed on the principal, on the object, and/or on the action proposed to be taken.

In FIG. 5, two types of objects are shown on which action may be taken by a principal. These include data objects, (e.g. data1 and data2 (520, 520')) and entity 530. A principal may operate or attempt to operate on any of these objects.

While data is passive, an entity 530 is active. The diagram line from Principal to an active entity is also labeled "action," but this could be a more sophisticated and arbitrarily complex action, such as making a function or method call or sending a message as compared with action on a data object. As with data, a security check enforced by the operating system may use the identity of the principal, the identity of the entity, and/or the type of action. Furthermore, the entity, being active, can perform its own additional security checks. These can be as arbitrarily complex as one desires, and can make use of the identity of the Principal, the identity of the entity itself, the action, and/or any other information that is available.

In an object-oriented system (such as the Java Card™ platform) "objects" are typically a combination of data and entity. When a Principal tries to access a field of an object, this is a data access—a fairly simple action protected by a fairly simple security check. When a Principal tries to access a method of an object, this is an entity access, which can be arbitrarily complex both in action and in security check.

Figure 6:
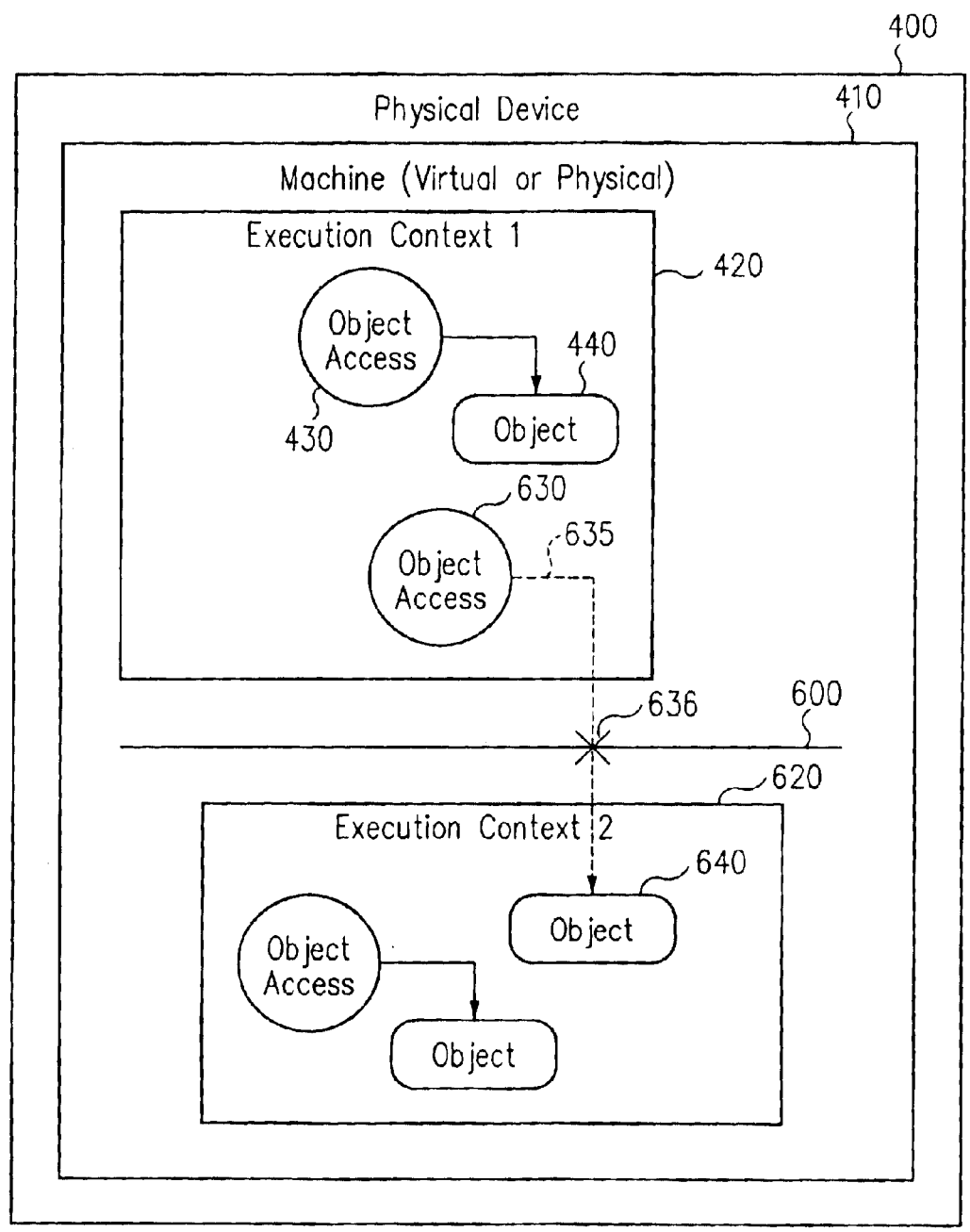
FIG. 6 is a block diagram showing separation of execution contexts by a firewall or context barrier in accordance with one aspect of the invention.

FIG. 6 is a block diagram showing separation of execution contexts by a firewall or context barrier in accordance with one aspect of the invention. The physical device 400 and the machine 410 correspond to the same items shown in FIG. 4. An execution context 420 shows one principal 430 attempting to access object 440 within the context. This access would normally succeed. However, execution context 420 also shows a principal 630 attempting to access object 640 of execution context 620, across a context barrier 600. Normally, this access would be prohibited as indicated by the X 636 where the action 635 crosses the context barrier 600.

Figure 7:
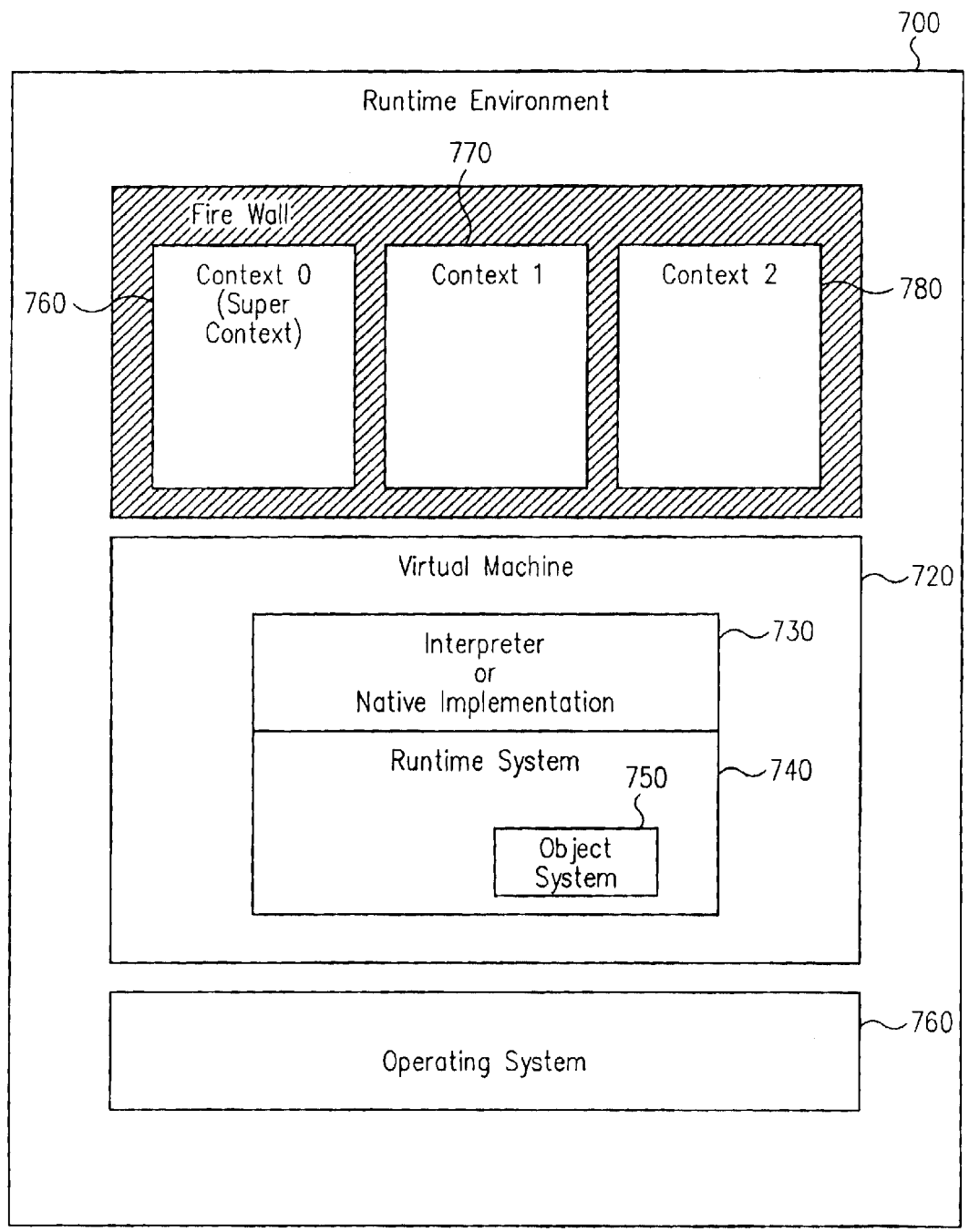
FIG. 7 is a representation of a software architecture useful in carrying out the invention.

FIG. 7 is a representation of a software architecture useful in carrying out the invention. This software architecture is shown as a run time environment 700. An operating system 710 for the small footprint device is commonly used. A virtual machine 720, in an exemplary embodiment of the invention, is implemented over the operating system. The virtual machine could be a Java Card™ virtual machine or other virtual machine. The capabilities of a standard virtual machine can be expanded to provide the additional functionality described herein or the functionality can be provided as separate modules. The virtual machine 720 may include an interpreter or native implementation 730 which provides access to a run time system 740. The run time system includes object system 750 for managing the objects of an object oriented implementation. Three contexts, 760, 770 and 780, are shown. Each context is separated from the other by a context barrier (sometimes referred to as a firewall) between the execution contexts. Context 760 is, in one specific embodiment, a supercontext. That is, context 760 has privileges and capabilities not available to subordinate contexts 770 and 780, potentially including privileges to create entry point objects or global data structures, and to access objects in subordinate contexts 770 and 780.

Every object is associated with one particular context. That context is said to own each object that is associated with it. The runtime system 740 provides a means for uniquely identifying contexts, and a means for specifying and identifying the currently executing context. The object system 750 provides a mechanism for associating objects with their owning contexts.

For example, the runtime 740 can identify contexts with a unique name, and correspondingly the object system 750 can associate objects with that context by recording the context's name in the object's header. Information in the object's header cannot be accessed by programs written in the object-oriented language, but is only available to the virtual machine 720 itself. Alternately, the runtime system 740 can identify contexts by dividing the memory space into separate regions, each for a particular context, and correspondingly the object system 750 can associate objects with that context by allocating the object's storage in that context's memory space.

Figure 8:
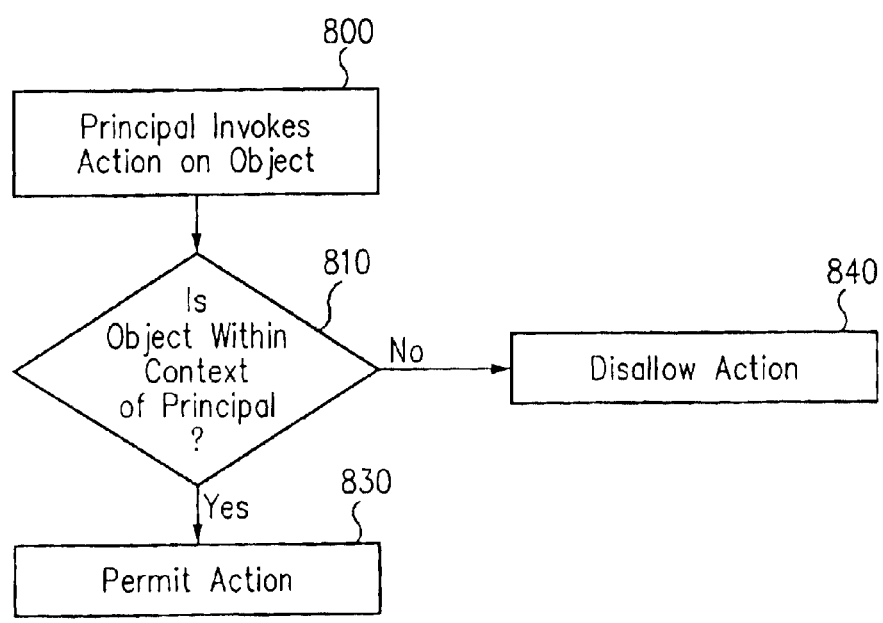
FIG. 8 is a flow chart of a security enforcement process implementing a firewall in accordance with one aspect of the invention.

FIG. 8 is a flow chart of a security enforcement process implementing a context barrier in accordance with one aspect of the invention. When a principal invokes an action on an object (800) a check is made to determine whether the object is within the context of the principal (810). If it is not, the action is disallowed (840). Otherwise, the action is permitted (830). This is the simplest form of context barrier or firewall. In one specific embodiment the action is disallowed (840) by throwing a security exception if the object is outside of the namespace or the memory space of the context requesting access.

Figure 9:
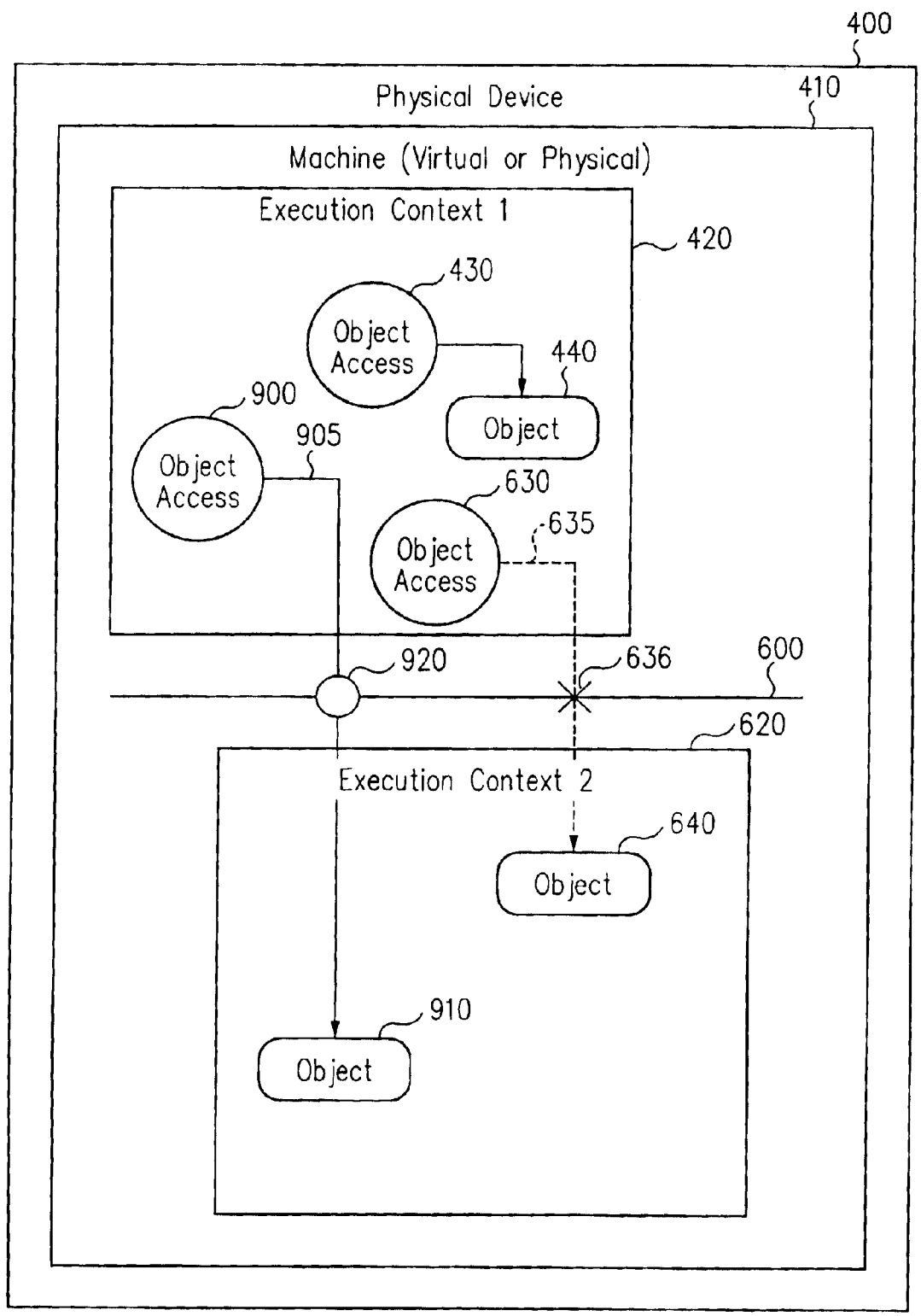
FIG. 9 is a block diagram showing object access across a firewall in accordance with one aspect of the invention.

FIG. 9 is a block diagram showing object access across a firewall in accordance with one aspect of the invention. FIG. 9 is substantially similar to FIG. 6. However, FIG. 9 also shows principal 900 seeking to access object 910 in order to perform action 905 on the object 910. According to the invention, rather than having the access blocked by the firewall 600, in the way that action 635 is blocked, action 905 is permitted to occur across the firewall through access point 920 so that principal 900 can perform action 905 on object 910 notwithstanding the fact that the principal and the object are in different execution contexts. The mechanisms behind access point 920 are described below with reference to FIGS. 12–18. Note that access point 920 can coexist with obstructed accesses such as X 636. Thus access point 920 provides fine-grain control of sharing (object by object security) across context barrier 600.

When object access 900 is initiated, the current context setting is context 420. If the object 910 is a data object, the action 905 is a simple data access, and no code is executed in the second context 620. If the object 910 is an entity object, and the action 905 results in that object's code being executed, that code is executed in the second context 620. To execute the code of object 910 in the correct context 620, the virtual machine 410 performs a context switch. The context switch changes the current context setting to be context 620, and the previous value of the current context setting is stored so that it can be restored later. From that point on code will execute in the new current context. When the action 905 completes, control is returned to the point following access 900. During the return, the virtual machine 410 must restore the value of the current context setting to its previous value.

Figure 10:
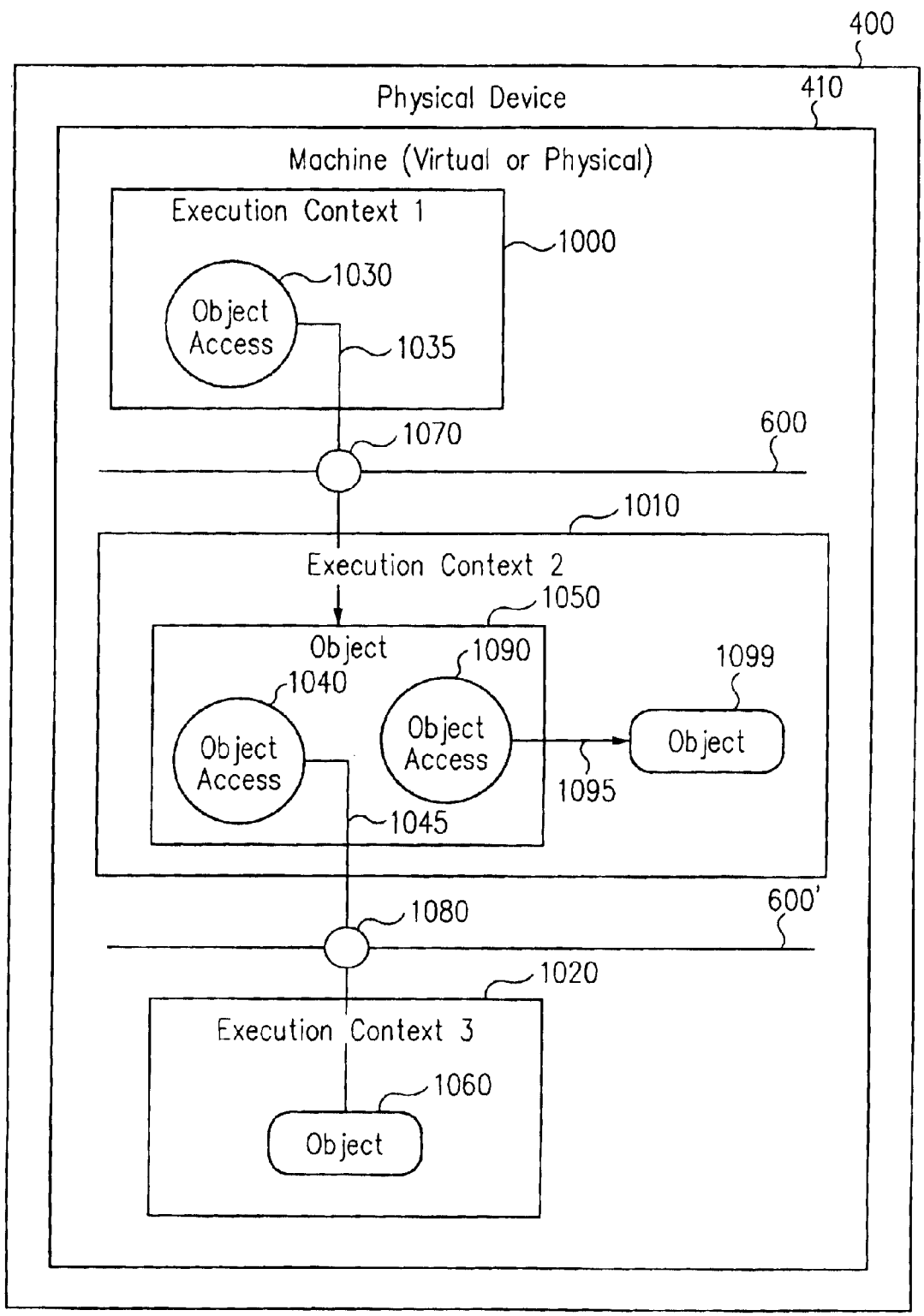
FIG. 10 is a block diagram showing cascaded object access across a firewall.

FIG. 10 is a block diagram showing cascaded object accesses across a firewall. FIG. 10 shows three execution contexts, 1000, 1010 and 1020. Principal 1030 in execution context 1 seeks to invoke an action 1035 on object 1050 in execution context 2 and does so through access point 1070 in context barrier 600. Object 1050 in execution context 2 has an object access 1040 which seeks to perform an action 1045 on the object 1060 in execution context 3. It achieves this by using access point 1080 in context barrier 600' separating execution contexts 2 and 3. Object 1050 in execution context 2 also has another object access 1090 which invokes an action 1095 on an object 1099 in the same execution context, that is, in execution context 2. Both actions 1035 and 1045 result in context switches as described in the explanation of FIG. 9. But as action 1095 does not cross the context barrier, a context switch is not required for its execution, and therefore does not occur.

Figure 11:
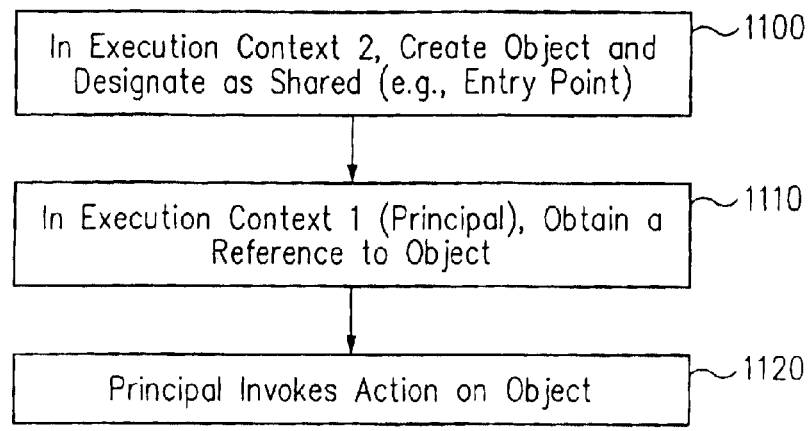
FIG. 11 is a flow chart of a process for permitting access by a principal in one context across a firewall into another context.

FIG. 11 is a flow chart of a process for permitting access by a principal in one context across a firewall into another context. There are essentially three steps to this process. In execution context 2, an object to be accessed is created and designated as shared (1100). In execution context 1, the principal obtains a reference to the object in execution context 2 (1110). The principal in execution context 1 then invokes an action upon the object designated as shared in context 2 (1120).

With respect to identifying or designating a created object as shareable as discussed in item 1100 of FIG. 11, this can be done, in accordance with a specific embodiment of the invention, by including a shareable attribute in the header of an object's representation. Information in an object's header cannot be accessed by programs written in the object-oriented language, but is only available to the VM itself.

Obtaining a reference to an object in another context is a special case of accessing an object in another context. A mechanism that provides access to an object in another context can make other objects available also. For instance, invoking a method on an object in another context may return a reference to a second object in a different context. An additional mechanism is required to allow an initial reference to an object in a different context to be obtained. In a specific embodiment, references to certain well-known entry point objects can be obtained using a public API. Once the initial reference to an object in a different context is obtained, further references can be obtained from that object, and so on.

There are four general approaches to obtaining information across a context barrier in accordance with the invention. These approaches can be utilized individually or in combination in order to access an object across a context barrier or to obtain a reference of an object to be accessed across a context barrier (1110). These approaches are described in FIGS. 12–18.

Figure 12:
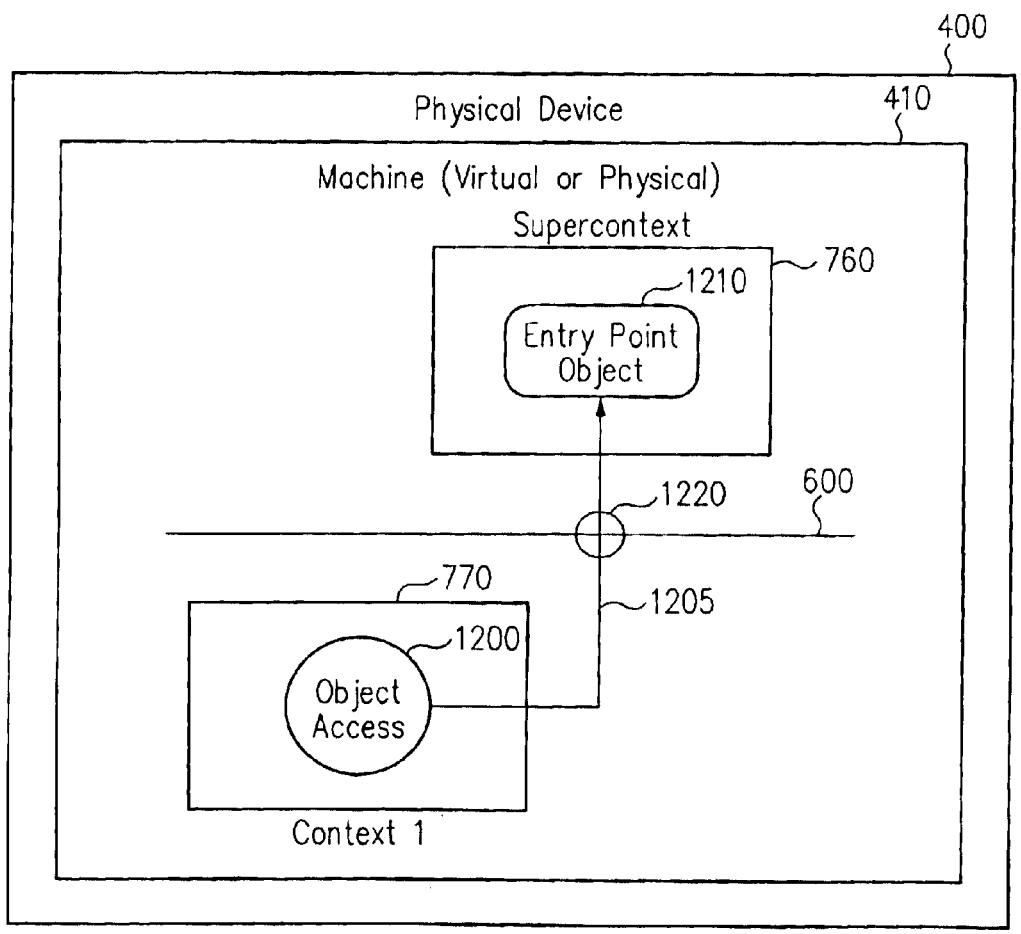
FIG. 12 is a block diagram illustrating the use of an entry point object to permit access across a firewall.

FIG. 12 is a block diagram illustrating the use of entry point objects to permit access across a context barrier. As shown in FIG. 12, some object 1200 in context 770 (context 1) desires access to information in supercontext 760. In the specific embodiment, a supercontext 760 contains at least one entry point object 1210. The entry point object 1210 can be published as part of a public API, or can be made available indirectly through a published API (e.g., in accordance with the mechanisms described previously with reference to FIG. 11), so that each context subordinate to the supercontext may communicate with the entry point object of the supercontext. (It will be appreciated that in other embodiments, entry point objects may be housed by a context other than the supercontext.)

Figure 13:
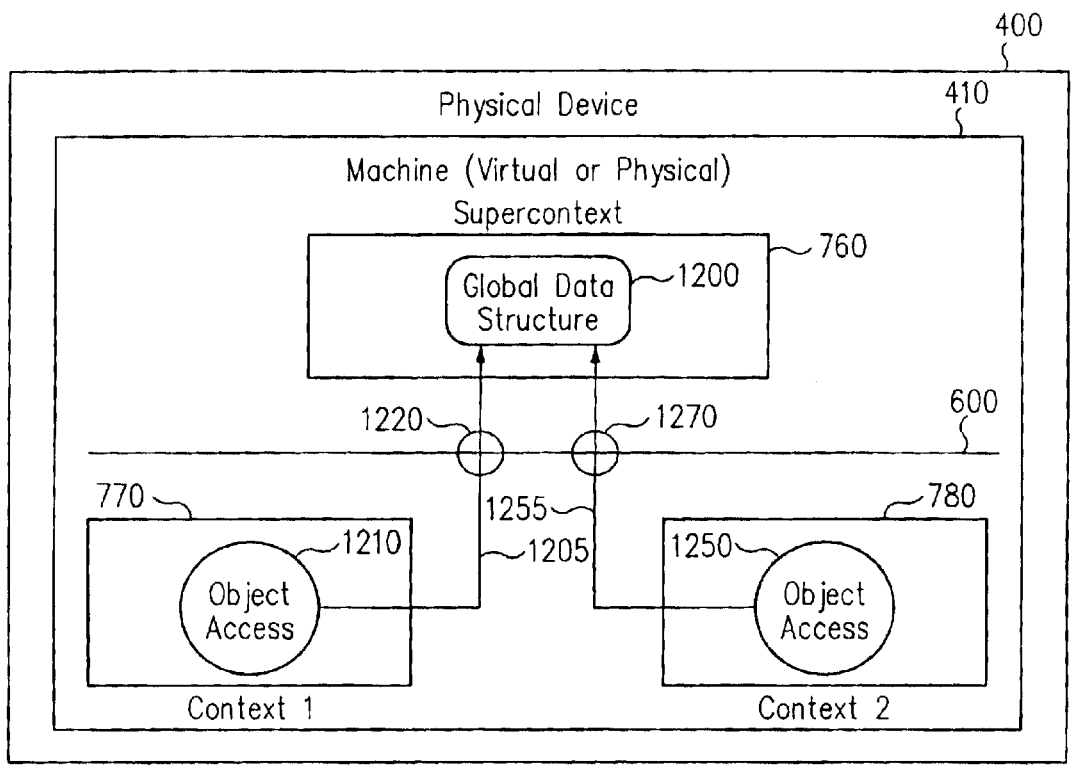
FIG. 13 is a block diagram illustrating the use of a global data structure such as an array for access across a firewall.

FIG. 13 is a block diagram illustrating the use of global data structures to permit access across a firewall. In this approach, supercontext 760 creates a global data structure such as a global array. In the specific embodiment supercontext 760 is the only context permitted to create such a global data structure. (It will be appreciated that in other embodiments, global data may be housed by a context other than the supercontext.) By virtue of its global status, each of the contexts 770 and 780 may read and write to the global data structure. Thus, information written into the global data structure by one context can be read by another context. For example, this mechanism can be used to pass binary data or references to objects between contexts.

Figure 14:
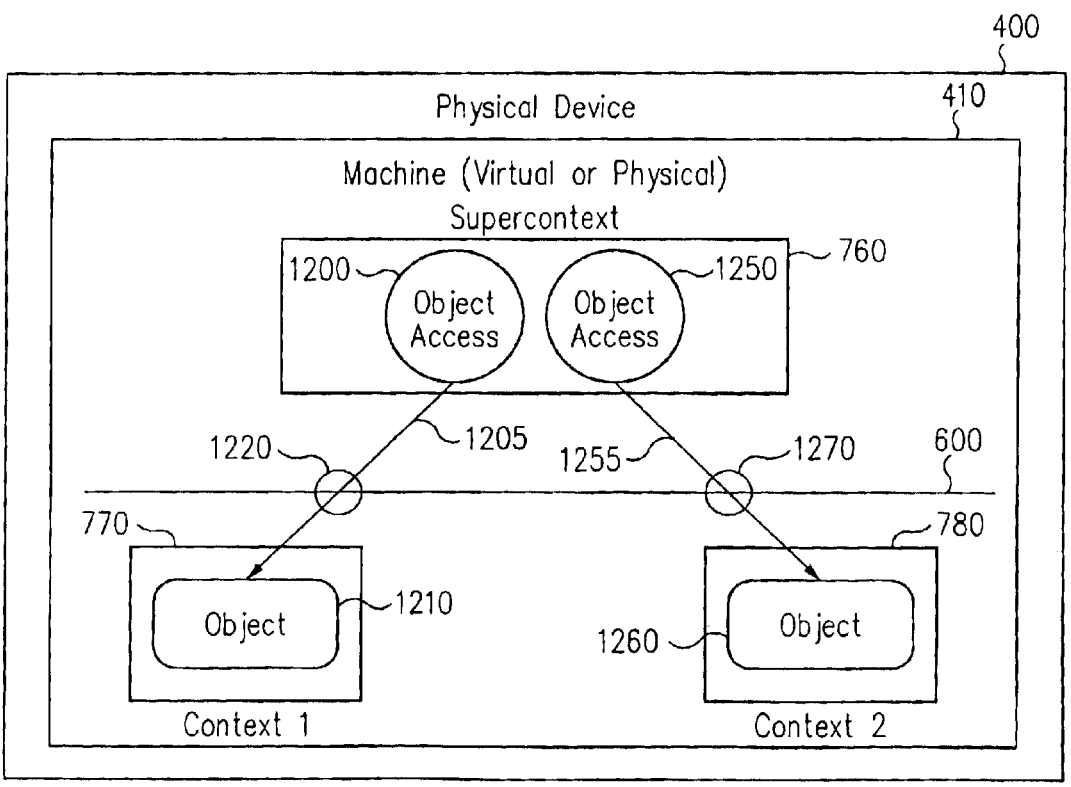
FIG. 14 is a block diagram illustrating the use of a supercontext to permit access across a firewall.

FIG. 14 is a block diagram illustrating the use of super-context privileges to permit access across a context barrier. In FIG. 14, an object in supercontext 760 seeks access to context 780 across the context barrier separating the two. Supercontext 760 can invoke any of the methods of context 780 and can access any of the data contained within context 780, by virtue of the privileges associated with the super-context.

Figure 15:
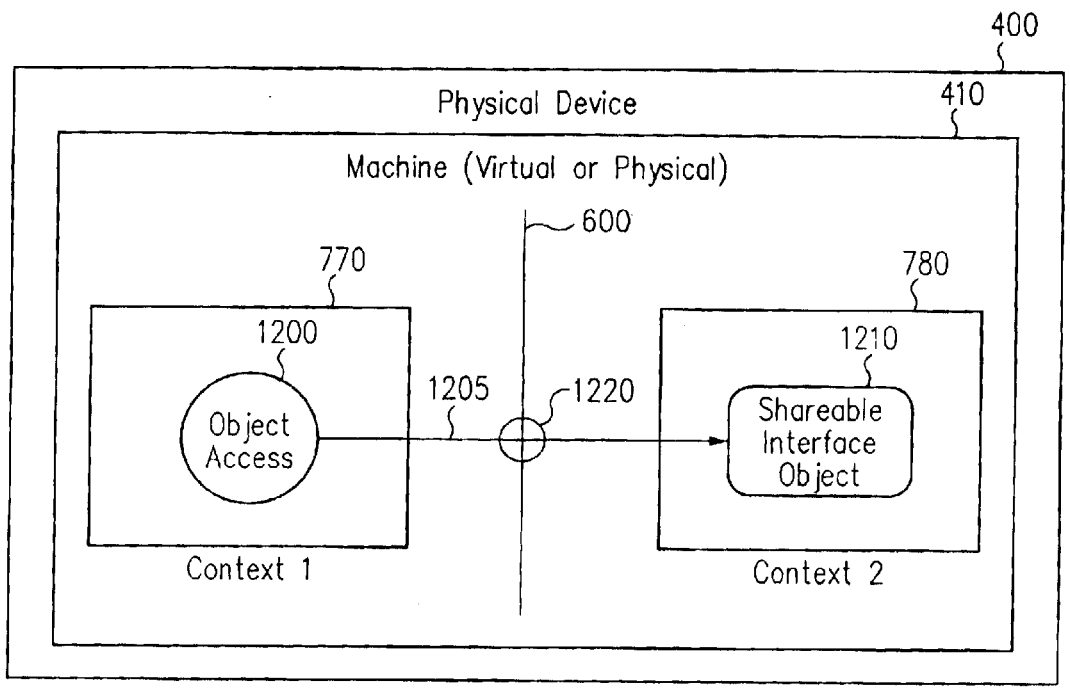
FIG. 15 is a block diagram illustrating the use of shareable interface objects to permit access across a firewall.

FIG. 15 is a block diagram illustrating the use of shareable interface objects to permit access across a firewall. A shareable interface defines a set of shareable interface methods. A shareable interface object is an object that implements at least the set of methods defined in a shareable interface. In FIG. 15, object 1210 in context 2 (780) is a shareable interface object. An object access 1200 in another context 770 can invoke any of the shareable interface methods on the object 1210 if the principal of the object access 1200 is authorized to do so by the object 1210 itself. This authorization is further discussed with reference to FIG. 18 below.

It will be appreciated that a virtual machine consistent with the invention provides functionality beyond that of earlier virtual machines, such as the virtual machine described in the Java™ Virtual Machine Specification. In particular, consistently with the invention, the virtual machine provides functionality to implement or to facilitate a security enforcement process that permits access across a firewall. This process is described next with reference to FIGS. 16–18. Note that it is applicable to any approach for providing access across the firewall, including but not limited to the four approaches described with reference to FIGS. 12–15 above.

Figure 16:
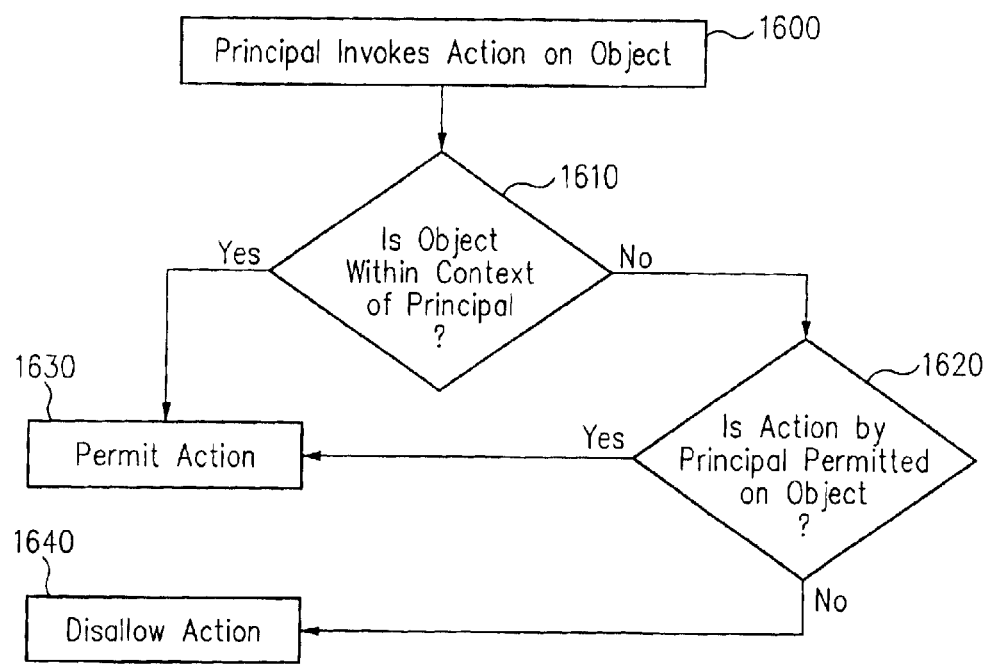
FIG. 16 is a flow chart of a security enforcement process permitting access across a firewall.

FIG. 16 is a flow chart of a security enforcement process permitting access across a firewall. When a principal attempts to invoke action on an object 1600, a check is made to determine if the object is within the context of the principal (1610). If it is, (1610-Y), the action is permitted (1630). If it is not, (1610-N), a check is made to see if the action by the principal is permitted on the object (1620). If it is, (1620-Y), the action is permitted (1630). If it is not, (1620-N), the action is disallowed. In the specific embodiment a security exception is thrown (1640).

Figure 17:
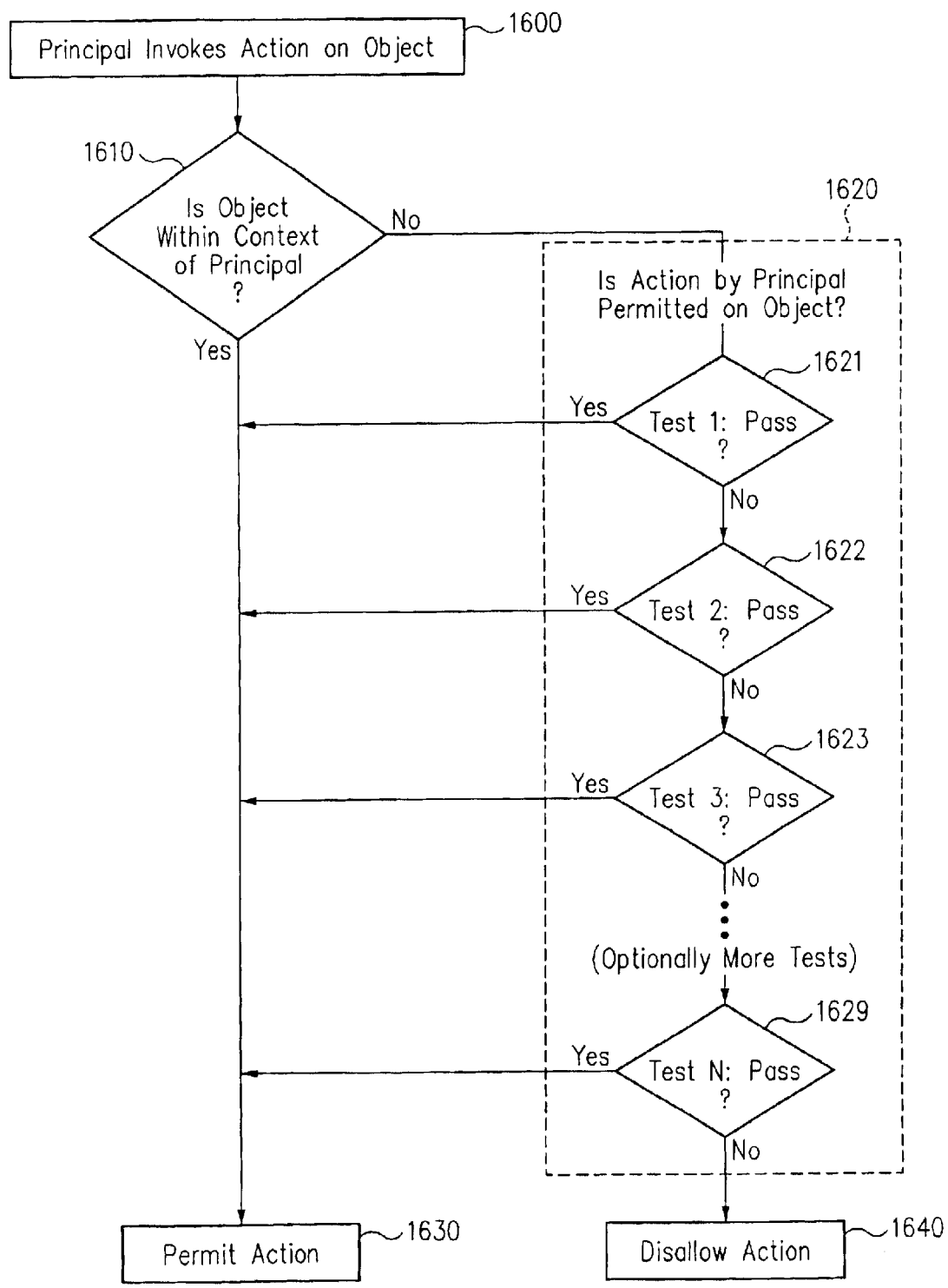
FIG. 17 is the flow chart of FIG. 16 showing details of block 1620.

FIG. 17 is the flow chart of FIG. 16 showing further details of block 1620. If the object is not within the context of the principal (1610-N), a plurality of tests, 1621, 1622, 1623 . . . 1629 are undertaken to see if the action by the principal is permitted on the object. These tests can be done by the virtual machine alone or by the virtual machine plus the object, in a virtual machine object oriented implementation. If any of the tests results in a pass, the action is permitted (1630). However, if all tests result in a negative determination (162X—No), the action will be disallowed. In a specific embodiment, a security exception will be thrown (1640). These tests relate to the permitted access discussed in conjunction with FIGS. 12–15.

Figure 18:
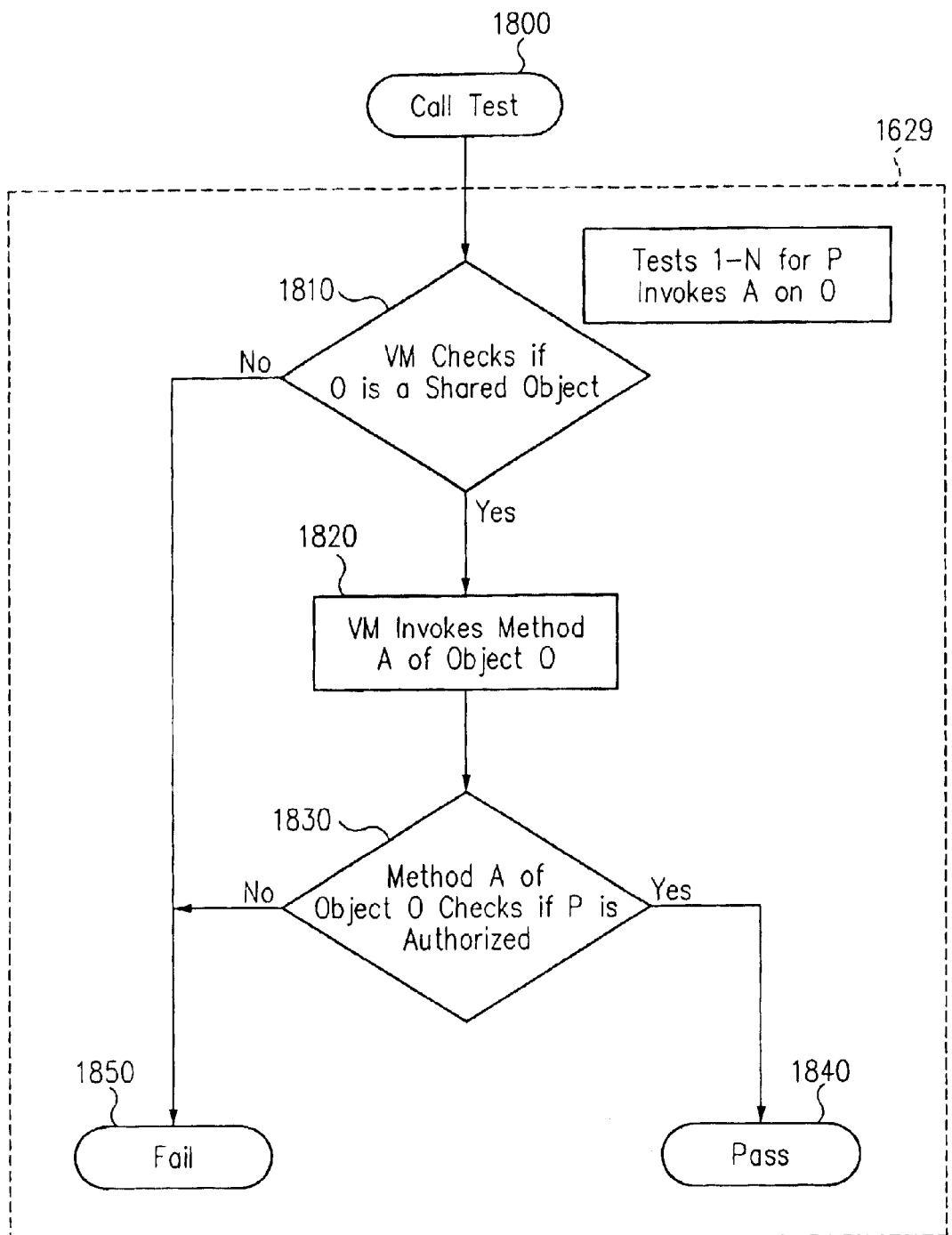
FIG. 18 is a flow chart showing an exemplary implementation of block 1629 of FIG. 17.

FIG. 18 is a flow chart showing an exemplary implementation of block 1629 of FIG. 17 for use with access method described in FIG. 15. In a test, such as 829 or 1629, a virtual machine checks if the object is a shared object 1810. If it is not (1810-No), the test will fail. However, if it is (1810-Yes), the virtual machine will invoke the method A on object O (1820). If the method A on object O determines that the principal is authorized (1830), the test will be passed (1840) and access permitted. Otherwise, the test will fail (1850). This allows the authorization text to be programmed into the code of the object itself.

Although the invention has been illustrated with respect to a smart card implementation, the invention is applies to other devices with a small footprint, not just to smart cards.

Devices with a small footprint are generally considered to be those that are restricted or limited in memory or in computing power or speed. Such small footprint devices may include boundary scan devices, field programmable devices, pagers and cellular phones among many others.

In general, small footprint devices are resource constrained computational devices and systems where secure interoperation of execution contexts is a concern. Such small devices impose constraints on the implementation of security measures because of their limited resources. Because of resource constraints, in a virtual machine implementation, a single virtual or physical machine must be used as opposed to multiple virtual machines.

The invention may also be applied to devices with larger footprints where the characteristics of the invention may prove beneficial. For example, the invention may prove advantageous when using servlets if there is object sharing between them. Even some desktop systems may profitably utilize the techniques of the invention.

While the Java™ language and platform are suitable for the invention, any language or platform having certain characteristics would be well suited for implementing the invention. These characteristics include type safety, pointer safety, object-oriented, dynamically linked, and virtual-machine based. Not all of these characteristics need to be present in a particular implementation. In some embodiments, languages or platforms lacking one or more of these characteristics may be utilized. A "virtual machine" could be implemented either in bits (virtual machine) or in silicon (real/physical machines).

Although the invention has been illustrated showing object by object security, other approaches, such as class by class security could be utilized.

Although the present invention has been described and illustrated in detail, it is clearly understood that the same is by way of illustration and example only and is not to be taken by way of limitation, the spirit and scope of the present invention being limited only by the terms of the appended claims and their equivalents.

What is claimed is:

1. A small footprint device comprising:
   at least one processing element configured to execute groups of one or more program modules in separate contexts, said one or more program modules comprising zero or more sets of executable instructions and zero or more sets of data definitions, said zero or more sets of executable instructions and said zero or more data definitions grouped as object definitions, each context comprising a protected object instance space such that at least one of said object definitions is instantiated in association with a particular context;
   a context barrier for separating and isolating said contexts, said context barrier configured for controlling execution of at least one instruction of one of said zero or more sets of instructions comprised by a program module based at least in part on whether said at least one instruction is executed for an object instance associated with a first one of said one or more separate contexts and whether said at least one instruction is requesting access to an instance of an object definition associated with a second one of said one or more separate contexts, said context barrier further configured to prevent said access if said access is unauthorized and enable said access if said access is authorized; and
   a global data structure for permitting one program module to access information from another program module by bypassing said context barrier, wherein an object instance is associated with a context by recording the name of said context in a header of said object instance, information in said header inaccessible to said one or more program modules.

2. A method of operating a small footprint device that includes a processing machine, wherein program modules are executed on the processing machine, the method comprising:
   separating contexts using a context barrier, said context barrier configured for controlling execution of at least one instruction of one of zero or more sets of instructions comprised by a program module based at least in part on whether said at least one instruction is executed for an object instance associated with a first one of said one or more separate contexts and whether said at least one instruction is requesting access to an instance of an object definition associated with a second one of said one or more separate contexts, said separating further comprising:
      preventing said access if said access is unauthorized; and
      enabling said access if said access is authorized;
   executing groups of one or more program modules in separate contexts, said one or more program modules comprising zero or more sets of executable instructions and zero or more sets of data definitions, said zero or more sets of executable instructions and said zero or more data definitions grouped as object definitions, each context comprising a protected object instance space such that at least one of said object definitions is instantiated in association with a particular context; and
   permitting access to information across said context barrier by bypassing said context barrier using a global data structure, wherein an object instance is associated with a context by recording the name of said context in a header of said object instance, information in said header inaccessible to said one or more program modules.

3. A method of permitting access to information on a small footprint device from a first program module to a second program module separated by a context barrier, said small footprint device comprising:
   at least one processing element configured to execute groups of one or more program modules in separate contexts, said one or more program modules comprising zero or more sets of executable instructions and zero or more sets of data definitions, said zero or more sets of executable instructions and said zero or more data definitions grouped as object definitions, each context comprising a protected object instance space such that at least one of said object definitions is instantiated in association with a particular context;
   a memory comprising instances of objects; and
   a context barrier for separating and isolating said contexts, said context barrier configured for controlling execution of at least one instruction of one of said zero or more sets of instructions comprised by a program module based at least in part on whether said at least one instruction is executed for an object instance associated with a first one of said one or more separate contexts and whether said at least one instruction is requesting access to an instance of an object definition associated with a second one of said one or more separate contexts, said context barrier further configured to prevent said access if said access is unauthorized and enable said access if said access is authorized, the method comprising:

creating a global data structure which may be accessed by at least two program modules; and using said global data structure to permit access to information across said context barrier by bypassing said context barrier, wherein an object instance is associated with a context by recording the name of said context in a header of said object instance, information in said header inaccessible to said one or more program modules.

4. A method of communicating across a context barrier separating program modules on a small footprint device, said small footprint device comprising:

at least one processing element configured to execute groups of one or more program modules in separate contexts, said one or more program modules comprising zero or more sets of executable instructions and zero or more sets of data definitions, said zero or more sets of executable instructions and said zero or more data definitions grouped as object definitions, each context comprising a protected object instance space such that at least one of said object definitions is instantiated in association with a particular context;

a memory comprising instances of objects; and a context barrier for separating and isolating said contexts, said context barrier configured for controlling execution of at least one instruction of one of said zero or more sets of instructions comprised by a program module based at least in part on whether said at least one instruction is executed for an object instance associated with a first one of said one or more separate contexts and whether said at least one instruction is requesting access to an instance of an object definition associated with a second one of said one or more separate contexts, said context barrier further configured to prevent said access if said access is unauthorized and enable said access if said access is authorized, the method comprising:

creating a global data structure;

permitting at least one program module to write information to said global data structure; and having at least one other program module read information from said global data structure, bypassing said context barrier, wherein an object instance is associated with a context by recording the name of said context in a header of said object instance, information in said header in accessible to said one or more program modules.

* * * * *